2 Sheets—Sheet 1.

C. A. HAGUE.
Sulky-Plow.

No. 199,153. Patented Jan. 15, 1878.

Witnesses:
O. W. Bond.
H. F. Binns.

Inventor
Charles A. Hague
By Witt & Bond Attys

C. A. HAGUE.
Sulky-Plow.
No. 199,153. Patented Jan. 15, 1878.
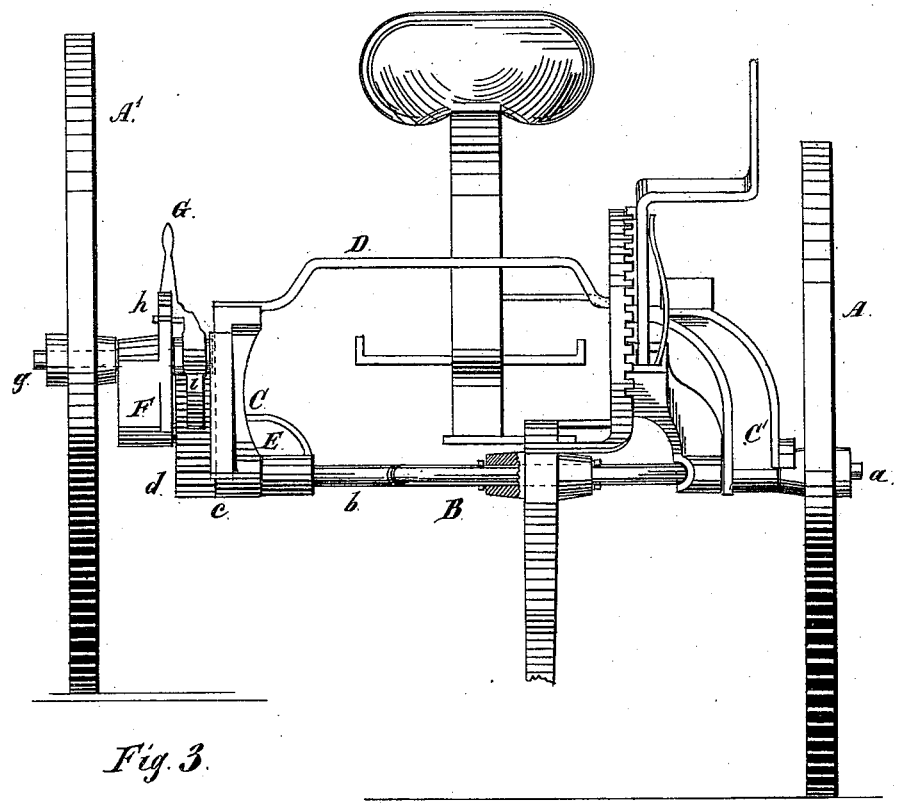
Fig. 3.
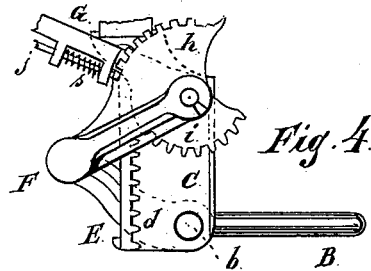
Fig. 4.
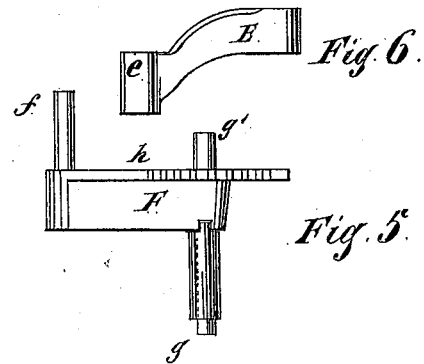
Fig. 6.
Fig. 5.
Witnesses:
Inventor:
Charles A. Hague
By West & Bond Attys

UNITED STATES PATENT OFFICE.

CHARLES A. HAGUE, OF CHICAGO, ILLINOIS.

IMPROVEMENT IN SULKY-PLOWS.

Specification forming part of Letters Patent No. 199,153, dated January 15, 1878; application filed July 28, 1877.

*To all whom it may concern:*

Be it known that I, CHARLES A. HAGUE, of the city of Chicago, Cook county, State of Illinois, have invented new and useful Improvements in Sulky and Gang Plows, of which the following is a full description, reference being had to the accompanying drawing, in which—

Figure 1:
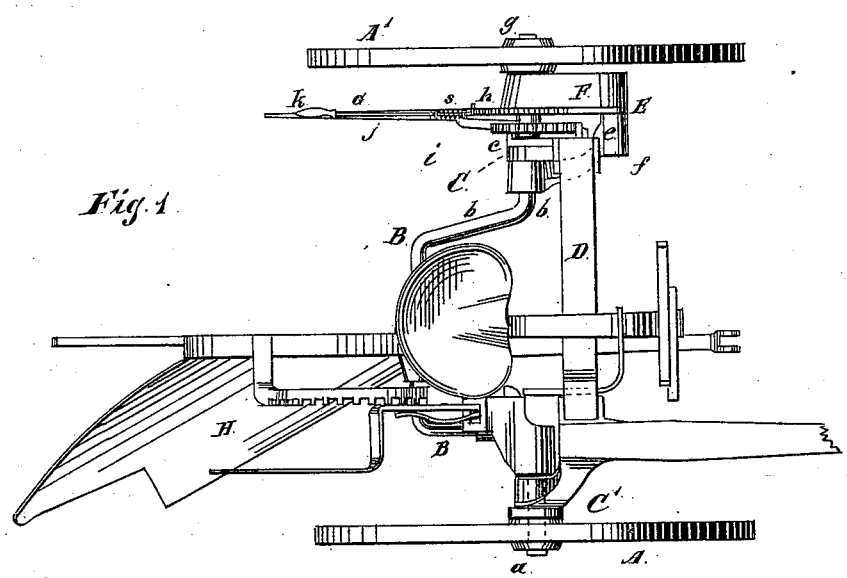
Figure 2:
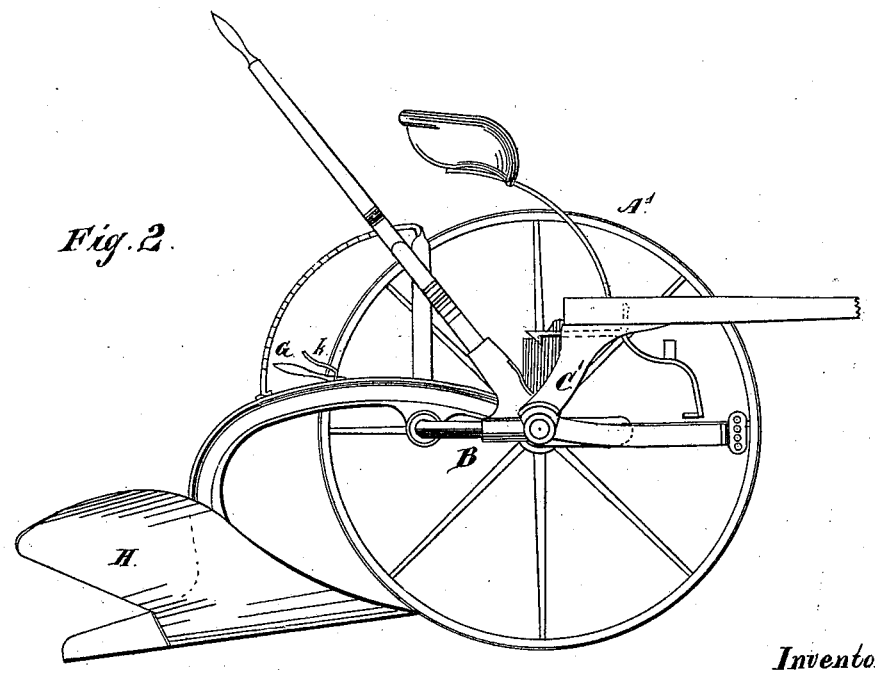

Figure 1 is a plan view; Fig. 2, a side elevation, with one wheel removed. Fig. 3 is a rear view; Figs. 4, 5, and 6, enlarged details.

In using sulky-plows the wheels do not usually run on the same level, and it is important to provide means by the use of which the plow can be leveled transversely.

The purpose of this invention is to provide improved devices for accomplishing this object. It consists in providing a short spindle, upon which the land-wheel is placed, which spindle is connected with the machine by means of hinged arms, and combined with devices by the use of which that part of the machine next to the land-wheel can be raised or lowered at pleasure, for the purpose of leveling the plow transversely. As shown, this is done by means of a lever and toothed sector, pivoted upon the inner end of the short spindle, the sector being arranged to engage with a rack on that part of the frame next to this spindle.

The furrow wheel and frame are carried on a crank, which extends nearly across the machine, on which crank the plow-beam is pivoted, and by raising and lowering the inner end of this crank the plow can be leveled.

By means of the construction shown, one side of the frame, with one end of the crank, can be raised or lowered vertically, and the axles of the wheels will always be in the same vertical plane.

In the drawings, A A' represent the two wheels. B represents a crank, one end of which is provided with a spindle, $a$, for the wheel A. The other end, $b$, only extends to the point $c$, and has no spindle for the other wheel. C C' are two brackets, pivoted or hinged upon the crank B. $d$ is a rack upon a flange upon the side of the bracket C. D is a cross-bar, secured firmly to the upper ends of the brackets C C'. E is an arm, pivoted or hinged upon the crank B, and extending forward therefrom. Its forward end is provided with a socket, $e$. F is another arm, which is provided with a spindle, $g$, to receive the wheel A', which spindle is permanently secured to the arm F, and extends through and projects from the inside thereof, as shown at $g'$. Upon the forward end of the arm F is a pin, $f$, which passes through the socket $e$ in arm E, and is held in place by means of a pin or key, or in other suitable manner. $h$ is a rack upon the arm F. It is a segment-rack. G is a lever, loosely secured upon $g'$. This lever is provided with a sector, $i$, which engages with the rack $d$ on the bracket C. $j$ is a rod, the lower end of which engages with the rack $h$, for the purpose of holding the lever and sector $i$ in any desired position. This rod is operated by means of a thumb-piece, $k$, and coil-spring $s$, in the usual manner. H is the plow, the beam of which is hinged upon the crank B.

In plowing, after a furrow has been turned the furrow-wheel runs on a lower level than the land-wheel, which throws the plow out of level. This difficulty can be remedied by my devices, by means of the lever G and sector $i$ and rack $d$, the lever G and sector $i$ being loosely connected to the inner end of the spindle $g$, and the rack $d$ being upon the bracket C, in which one end of the crank is hinged. While the forward ends of the arms F and E are hinged together, the other ends of these arms are connected as follows: F rigidly to the spindle $g$, and E freely to the crank B. Hence, as the sector $i$ moves up or down in the rack $d$, the rack will be depressed or raised, carrying with it the end of the crank B which is journaled in C, and thus the plow can be leveled transversely, though the position of the wheels relatively to each other be changed.

In starting the plow it is sometimes desirable to tilt it, while the wheels remain on a level. This can be done as before described.

The movement of the bracket C is in a vertical line, so that the wheels always remain directly opposite to each other, in which position the plow runs easier than when not opposite, which is the case in some plows having leveling devices.

The brackets C C' and bar D may be regarded as the frame of the machine.

What I claim as new, and desire to secure by Letters Patent, is—

1. The independent spindle $g$, carrying the land-wheel $A'$, and connected with the machine by arms F E, in combination with lever G and rack $d$, for vertically raising and lowering that portion of the frame and crank next to the land-wheel, for the purpose of leveling the plow transversely, and at the same time keeping the axles of the wheels in the same vertical plane, substantially as specified.

2. The spindle $g$, carrying the land-wheel, crank B, frame C C' D, arms F E, hinged to each other at $f$, the arm F being secured to the spindle $g$, and the arm E being hinged to the crank B, in combination with devices for raising and lowering the end of the frame and axle next to the land-wheel, substantially as specified.

3. The spindle $g$, carrying the land-wheel, in combination with the crank B, frame C C' D, rack $d$, arms F E, lever G, and sector $i$, all constructed and operating substantially as described.

CHARLES A. HAGUE.

Witnesses:
 E. A. WEST,
 O. W. BOND.